US012065861B2

(12) United States Patent
Araki et al.

(10) Patent No.: US 12,065,861 B2
(45) Date of Patent: Aug. 20, 2024

(54) VEHICLE DOOR HANDLE DEVICE

(71) Applicant: AISIN CORPORATION, Kariya (JP)

(72) Inventors: Nobukazu Araki, Kariya (JP); Mizuya Sakamoto, Kariya (JP)

(73) Assignee: AISIN CORPORATION, Aichi (JP)

( * ) Notice: Subject to any disclaimer, the term of this patent is extended or adjusted under 35 U.S.C. 154(b) by 444 days.

(21) Appl. No.: 16/946,061

(22) Filed: Jun. 4, 2020

(65) Prior Publication Data

US 2020/0386014 A1 Dec. 10, 2020

(30) Foreign Application Priority Data

Jun. 6, 2019 (JP) ................................ 2019-106380

(51) Int. Cl.
*E05B 79/06* (2014.01)
*E05B 85/10* (2014.01)

(52) U.S. Cl.
CPC .............. *E05B 79/06* (2013.01); *E05B 85/10* (2013.01)

(58) Field of Classification Search
CPC .......... E05B 79/06; E05B 85/10; E05B 85/14; E05B 85/16; E05B 85/18; Y10T 292/57; Y10S 292/53
See application file for complete search history.

(56) References Cited

U.S. PATENT DOCUMENTS 3,922,770 A * 12/1975 Ladouceur ............ F16B 37/068 29/445
7,226,096 B2 * 6/2007 Ito .......................... E05B 85/14 292/DIG. 31
7,344,168 B2 * 3/2008 Matsubara .............. E05B 79/06 292/336.3

(Continued)

FOREIGN PATENT DOCUMENTS

CN 101514602 B * 4/2013 ............. E05B 81/76
DE 4029694 A * 4/1991 ............. E05B 79/06

(Continued)

OTHER PUBLICATIONS

English Translation for JP 2015196985 A, Translation acquired using https://worldwide.espacenet.com/ (Year: 2023).*

(Continued)

*Primary Examiner* — Alyson M Merlino
(74) *Attorney, Agent, or Firm* — BUCHANAN INGERSOLL & ROONEY PC

(57) ABSTRACT

A vehicle door handle device includes: a base frame formed of a resin and arranged on an inner side of a door outer panel; a pad member arranged on an outer side of the door outer panel; a first fastening member formed of a metal and having a base frame engaging portion and a first panel engaging portion engageable with the inner side of the door outer panel; and a second fastening member formed of a metal and having a held portion and a second panel engaging portion engageable with the outer side of the door outer panel. The (Continued)

first and second fastening members are fastened to each other, the door outer panel is sandwiched between the first and second panel engaging portions, and the base frame engaging portion engages the base frame to restrict movement of the base frame in a direction away from the door outer panel.

2 Claims, 9 Drawing Sheets

(56) References Cited

U.S. PATENT DOCUMENTS

| | | | | |
|---|---|---|---|---|
| 7,971,913 | B2 * | 7/2011 | Sunahara | E05B 85/16<br>292/336.3 |
| 8,162,360 | B2 * | 4/2012 | Takaya | E05B 79/06<br>292/336.3 |
| 9,181,733 | B2 * | 11/2015 | Fujiwara | E05B 79/06 |
| 9,322,200 | B1 * | 4/2016 | Shimizu | E05B 79/06 |
| 9,382,734 | B2 * | 7/2016 | Rosales | E05B 85/16 |
| 9,556,655 | B2 * | 1/2017 | Shimizu | E05B 85/16 |
| 10,107,017 | B2 * | 10/2018 | An | E05B 79/06 |
| 10,174,529 | B2 * | 1/2019 | Saitou | E05B 85/16 |
| 10,443,275 | B2 * | 10/2019 | Nagata | E05B 79/06 |
| 2010/0237635 | A1 * | 9/2010 | Ieda | E05B 81/78<br>292/336.3 |
| 2014/0310916 | A1 * | 10/2014 | Shimizu | E05B 85/16<br>16/412 |
| 2015/0368936 | A1 * | 12/2015 | Chappuis | E05B 79/06<br>49/460 |
| 2017/0152685 | A1 | 6/2017 | Nagata et al. | |
| 2020/0277811 | A1 * | 9/2020 | Yamada | E05B 79/06 |

FOREIGN PATENT DOCUMENTS

| | | | | | |
|---|---|---|---|---|---|
| EP | 2 090 728 | A2 | | 8/2009 | |
| JP | 3397286 | B2 | * | 4/2003 | |
| JP | 2006-064115 | A | | 3/2006 | |
| JP | 2013124453 | A | * | 6/2013 | |
| JP | 2015-196985 | A | | 11/2015 | |
| JP | 2016030921 | A | | 3/2016 | |
| JP | 2017101408 | A | | 6/2017 | |
| KR | 2001062943 | A | * | 7/2001 | E05B 85/10 |
| KR | 2004110940 | A | * | 12/2004 | E05B 85/10 |

OTHER PUBLICATIONS

English Translation of the Office Action (Notice of Reasons for Refusal) issued Nov. 29, 2022, by the Japan Patent Office in corresponding Japanese Patent Application No. 2019-106380. (3 pages).

* cited by examiner

VEHICLE DOOR HANDLE DEVICE

CROSS REFERENCE TO RELATED APPLICATIONS

This application is based on and claims priority under 35 U.S.C. § 119 to Japanese Patent Application 2019-106380, filed on Jun. 6, 2019, the entire content of which is incorporated herein by reference.

TECHNICAL FIELD

This disclosure relates to a vehicle door handle device.

BACKGROUND DISCUSSION

JP 2016-030921A (Reference 1) discloses a vehicle door handle device including a base frame, an outside handle, a retainer (metallic nut), and a pad member. The base frame is arranged on the vehicle inner side of a door outer panel of a vehicle door, and the retainer is arranged on the vehicle outer side of the outer panel. Then, a bolt inserted into the base frame is fastened to the retainer, and the door outer panel is sandwiched between the base frame and the pad member, so that the base frame is fixed to the outer panel.

JP 2017-101408A (Reference 2) discloses a vehicle door handle device including a handle holding member (base frame), a metallic nut, a metallic bolt, a metallic spacer, and a metallic collar. The handle holding member is arranged on the vehicle inner side of a door outer panel of a vehicle door, and the metallic nut is arranged on the vehicle outer side of the outer panel so as to realize engagement. Then, the metallic bolt inserted into the handle holding member is fastened to the metallic nut, so that the handle holding member is assembled to the door outer panel. Furthermore, the spacer is interposed between the metallic bolt and the outer panel, and the door outer panel is sandwiched between the spacer and the metallic nut.

In the vehicle door handle device disclosed in Reference 1, the base frame is attached to the outer panel by the bolt. With this configuration, when the temperature of the vehicle door handle device becomes high, the base frame formed of a resin may be softened or deformed, which may reduce the fastening force by the bolt. This may cause the base frame to rattle against the outer panel. In the vehicle door handle device disclosed in Reference 2, since the outer panel is sandwiched between the metallic nut and the spacer, there occurs no reduction in the fastening force by the bolt even if the base frame is softened or deformed. However, in the configuration disclosed in Reference 2, due to the use of the metallic spacer, the number of parts increases and thus, the cost of parts increases.

A need thus exists for a vehicle door handle device which is not susceptible to the drawback mentioned above.

SUMMARY

A vehicle door handle device according to an aspect of this disclosure includes a base frame formed of a resin material and arranged on a vehicle inner side of a door outer panel that constitutes a surface on a vehicle outer side of a vehicle door, a pad member arranged on a vehicle outer side of the door outer panel, a first fastening member formed of a metal material and having a base frame engaging portion that is engageable with the base frame and a first panel engaging portion that is engageable with a surface on the vehicle inner side of the door outer panel, and a second fastening member formed of a metal material and having a held portion held by the pad member and a second panel engaging portion that is engageable with a surface on the vehicle outer side of the door outer panel, in which the first fastening member and the second fastening member are fastened to each other, the door outer panel is sandwiched between the first panel engaging portion and the second panel engaging portion, and the base frame engaging portion is engaged with the base frame so as to restrict movement of the base frame in a direction away from the door outer panel.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, each embodiment disclosed here will be described with reference to the accompanying drawings. For convenience of description, a vehicle door handle device according to each embodiment disclosed here may be abbreviated as a "handle device." Further, in the following description, with regard to the orientation of the handle device and constituent members thereof, when viewed from a door outer panel, the vehicle inside direction (the interior side of a vehicle door) is referred to as the "vehicle inner side," and the vehicle outside direction (the exterior side of the vehicle door) is referred to as the "vehicle outer side." Further, the "front side" and the "rear side" refer to the directions in a state where the vehicle door is closed. In each drawing, the vehicle outer side is indicated by arrow O, the vehicle inner side is indicated by arrow I, the front side is indicated by arrow Fr, and the rear side is indicated by arrow Rr.

First Embodiment

Figure 1:
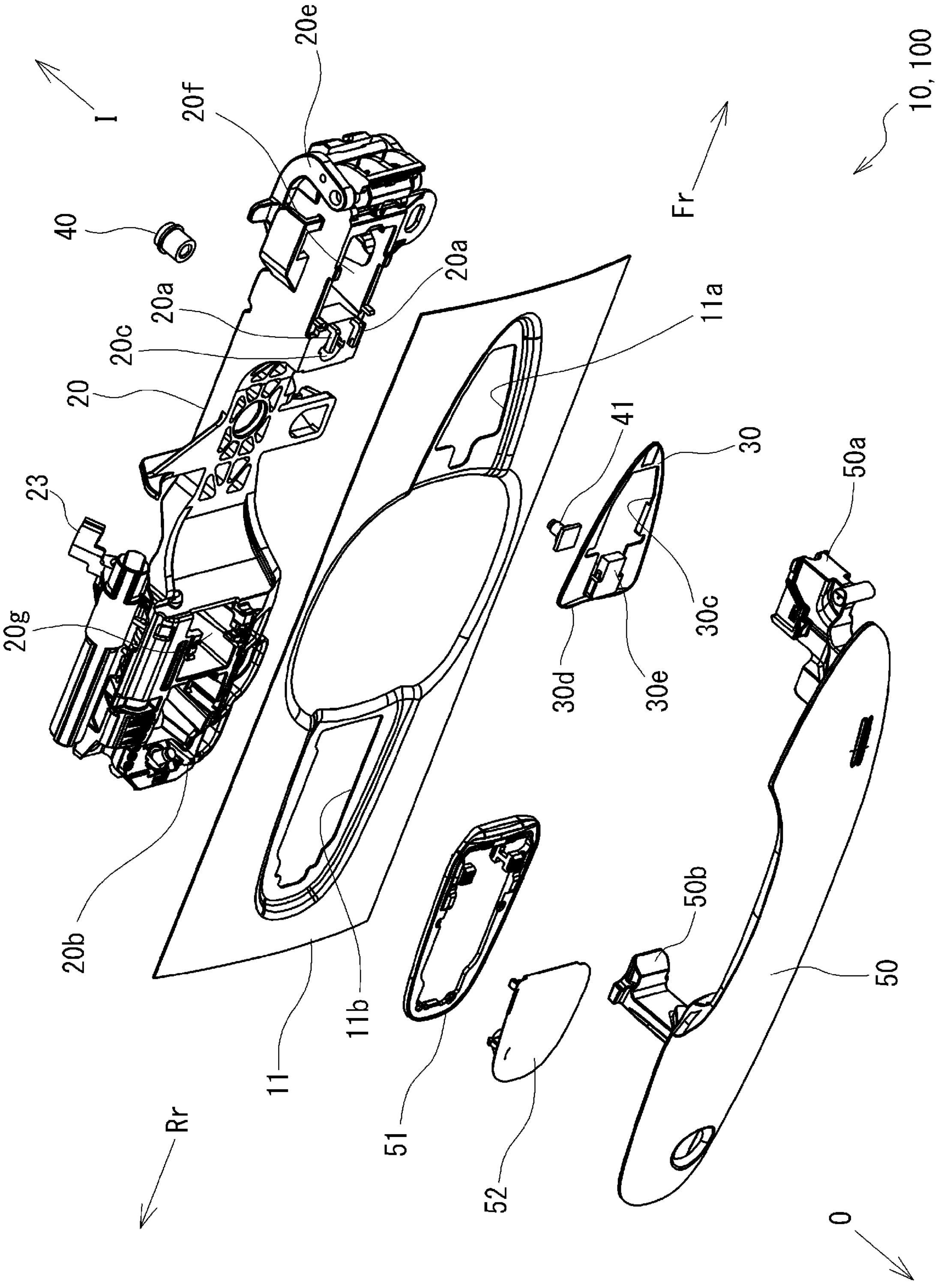
FIG. 1 is an exploded perspective view schematically illustrating a configuration example of a vehicle door handle device according to a first embodiment.
Figure 2:
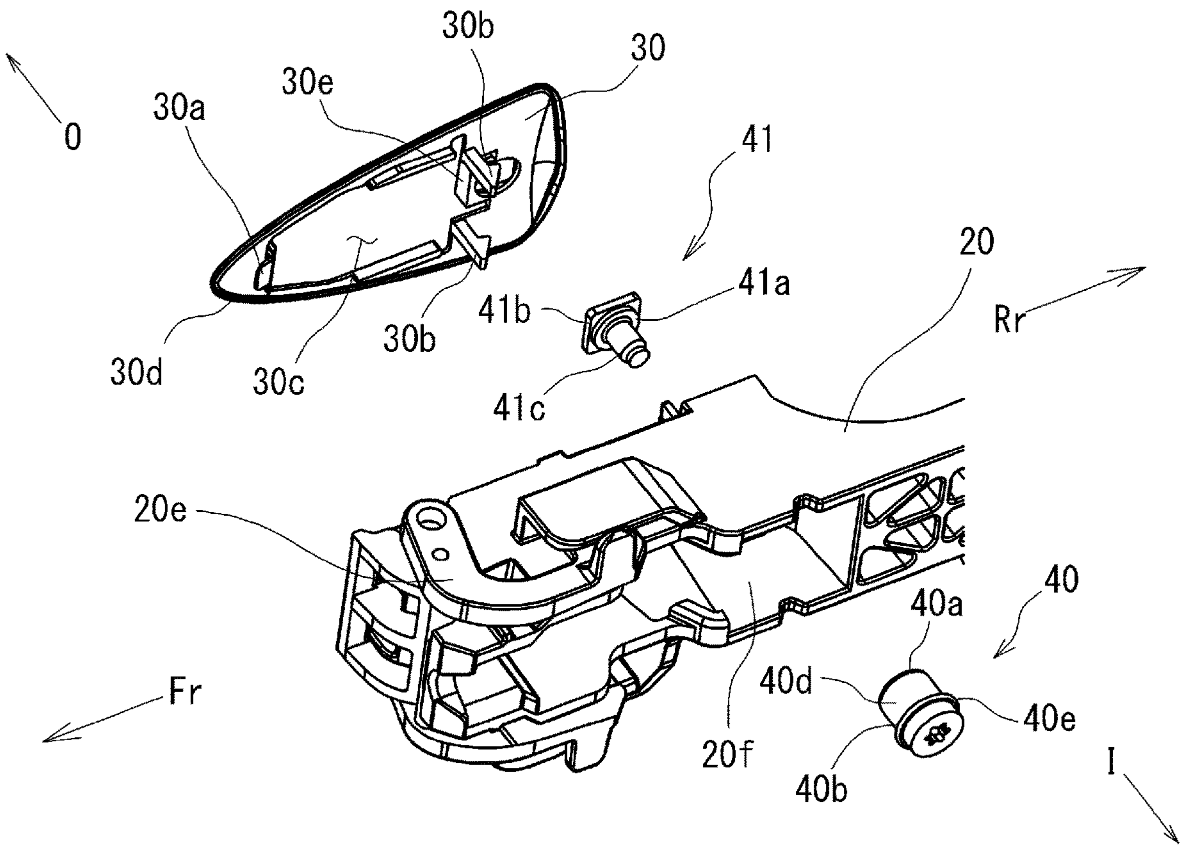
FIG. 2 is an exploded perspective view schematically illustrating the configuration example of the vehicle door handle device according to the first embodiment.

FIGS. 1 and 2 are exploded perspective views schematically illustrating a configuration example of major parts of a handle device 100. FIG. 1 is a view as seen from the vehicle outer side (the exterior side of a vehicle door 10), and FIG. 2 is a view as seen from the vehicle inner side (the interior side of the vehicle door 10). The handle device 100 is configured as an assembly (also referred to as an "assy") in which a plurality of constituent members are integrally assembled. The plurality of members constituting the handle device 100 include a base frame 20, an outside handle 50, a front side pad member 30, a rear side pad member 51, a cap member 52, a first fastening member 40, and a second fastening member 41. Then, the handle device 100 is attached to a door outer panel 11 which constitutes the surface on the vehicle outer side of the vehicle door 10. The door outer panel 11 is provided with two openings (a front side opening 11*a* and a rear side opening 11*b*) at positions separated in the longitudinal direction where the handle device 100 is assembled.

The base frame 20 is a member arranged on the vehicle inner side of the door outer panel 11, and is configured to be attached to the door outer panel 11 from the vehicle inner side. The base frame 20 is formed of a resin material, and has a front side engaging portion 20*a*, a rear side engaging portion 20*b*, and a first fastening member accommodating portion 20*c*. Further, the base frame 20 has a long rod shape, and is attached to the door outer panel 11 in such an orientation that the lengthwise direction thereof is parallel to the longitudinal direction of a vehicle.

The front side engaging portion 20*a* is provided at a front side position of the base frame 20, and is configured to be able to be engaged with the inner peripheral edge of the front side opening 11*a* in the door outer panel 11. The rear side engaging portion 20*b* is provided near the rear end of the base frame 20, and is configured to be able to be engaged with the inner peripheral edge of the rear side opening 11*b* in the door outer panel 11. For example, both the front side engaging portion 20*a* and the rear side engaging portion 20*b* may have a hook-like configuration in which they protrude to the vehicle outer side and have a substantially L-shaped shape when viewed in the vertical direction. Then, with the above-described configuration of the front side engaging portion 20*a* and the rear side engaging portion 20*b*, by protruding the front side engaging portion 20*a* and the rear side engaging portion 20*b* from the vehicle inner side to the vehicle outer side through the front side opening 11*a* and the rear side opening 11*b* respectively and in this state, moving the base frame 20 to the rear side, the front side engaging portion 20*a* and the rear side engaging portion 20*b* may be engaged with the respective inner peripheral edges of the front side opening 11*a* and the rear side opening 11*b*. Then, when the front side engaging portion 20*a* and the rear side engaging portion 20*b* are engaged with the inner peripheral edges of the front side opening 11*a* and the rear side opening 11*b* respectively, the base frame 20 is held by the door outer panel 11, which restricts the base frame 20 from moving to the vehicle inner side (away from the door outer panel 11 to the vehicle inner side).

The first fastening member accommodating portion 20*c* is an opening (through-hole) that is able to accommodate therein the first fastening member 40. An engaging rib 20*d* that is able to be engaged with the first fastening member 40 is provided on the inner peripheral surface of the first fastening member accommodating portion 20*c* (see FIG. 5). As illustrated in FIG. 1, the first fastening member accommodating portion 20*c* is provided near the front side engaging portion 20*a*. Specifically, two front side engaging portions 20*a* are arranged in the vertical direction, and the first fastening member accommodating portion 20*c* is provided between the two front side engaging portions 20*a*.

Moreover, the base frame 20 has a hinge 20*e*, an arm accommodating portion 20*f*, and a leg accommodating portion 20*g*, and a lever member 23 and a biasing member (not illustrated) are assembled thereto. The hinge 20*e* is a portion that rotatably supports an arm 50*a* of the outside handle 50. The arm accommodating portion 20*f* is an opening that is able to accommodate therein the arm 50*a* of the outside handle 50 to enable insertion and removal thereof. The leg accommodating portion 20*g* is an opening that is able to accommodate therein a leg 50*b* of the outside handle 50 to enable insertion and removal thereof. The lever member 23 is a member that is able to be engaged with the leg 50*b* of the outside handle 50. The biasing member biases the lever member 23 in a predetermined direction to bias the leg 50*b* of the outside handle 50 engaged with the lever member 23 toward the vehicle inner side. The configurations of the hinge 20*e*, the arm accommodating portion 20*f*, the leg accommodating portion 20*g*, the lever member 23, and the biasing member are not particularly limited, and various other known configurations may be applied.

The outside handle 50 is a grip type handle having a long rod shape, and is assembled to the base frame 20 in such an orientation that the lengthwise direction thereof is parallel to the longitudinal direction of the vehicle. The arm 50*a* is provided on the front end of the outside handle 50 to protrude to the vehicle inner side. The arm 50*a* is a portion that is rotatably connected to the hinge 20*e* of the base frame 20. The leg 50*b* is provided at a rear position of the outside handle 50 to protrude to the vehicle inner side. The leg 50*b* is a portion that is engaged with the lever member 23. Further, the leg 50*b* is configured to be connected to a door lock mechanism (not illustrated) via a connecting rod (not illustrated). When the outside handle 50 rotates to the vehicle outer side about the hinge 20*e*, this motion is transmitted to the door lock mechanism via the connecting rod, causing the door lock mechanism to be switched from the locked state to the unlocked state. In addition, the configuration of the outside handle 50 is not particularly limited, and various other conventionally known configurations may be applied.

The front side pad member 30 is a member formed of a non-metallic material, and is typically a member formed of a resin material. The front side pad member 30 is arranged so as to be interposed between the outside handle 50 and the door outer panel 11, and has a function of preventing the door outer panel 11 from being scratched, a soundproof function, and a waterproof function.

The front side pad member 30 has an opening 30*c*, a seal 30*d*, a panel engaging portion 30*a*, a base frame engaging portion 30*b*, and a second fastening member holding portion 30*e*. The opening 30*c* is a through-hole through which the arm 50*a* provided on the outside handle 50 may be inserted. The seal 30*d* is a portion that is interposed between the outside handle 50 and the door outer panel 11 to seal a gap therebetween. The panel engaging portion 30*a* is configured to be able to be engaged with the inner peripheral edge of the front side opening 11*a* in the door outer panel 11. For example, the panel engaging portion 30*a* may have a hook-like configuration in which it protrudes to the vehicle inner side and has a substantially L-shaped shape when viewed in the vertical direction. The base frame engaging portion 30*b* is configured to be able to be engaged with the base frame 20 in, for example, a snap-fit manner. Then, by protruding the panel engaging portion 30*a* and the base frame engaging portion 30*b* from the vehicle outer side of the door outer panel 11 to the vehicle inner side through the front side opening 11*a*, the panel engaging portion 30*a* is engaged with the inner peripheral edge of the front side opening 11*a*, and the base frame engaging portion 30*b* is engaged with the base frame 20. Thus, the front side pad member 30 is held by the vehicle door 10.

The second fastening member holding portion 30*e* has a function of holding the second fastening member 41. In the present embodiment, a configuration in which the second fastening member 41 is insert-molded on the front side pad member 30 so that the second fastening member holding portion 30*e* holds the second fastening member 41 is applied. However, the second fastening member holding portion 30*e* is not limited to the configuration in which the second fastening member 41 is insert-molded. For example, a configuration in which a T-shaped groove is formed in the second fastening member holding portion 30*e* to extend in the longitudinal direction and the second fastening member 41 is fitted into the T-shaped groove may also be applied. In short, the second fastening member holding portion 30*e* may have any other configuration as long as it prevents the second fastening member 41 from being separated from the front side pad member 30 and also prevents the second fastening member 41 from rotating relative to the front side pad member 30.

Further, the second fastening member holding portion 30*e* is formed so as to be located between the two front side engaging portions 20*a* of the base frame 20 in a state of being assembled to the vehicle door 10. Then, the second fastening member 41 is sandwiched between the two front side engaging portions 20, so that the front side pad member 30 is prevented from rotating relative to the base frame 20 when the front side pad member 30 and the base frame 20 are fastened to each other by the first fastening member 40 and the second fastening member 41.

Similarly to the front side pad member 30, the rear side pad member 51 is a member formed of a non-metallic material, and is typically a member formed of a resin material. The rear side pad member 51 has a function of preventing the door outer panel 11 from being scratched, a soundproof function, and a waterproof function. Then, the rear side pad member 51 is arranged to surround the circumference of the rear side opening 11*b* in the door outer panel 11 and be interposed between the door outer panel 11 and the outside handle 50. The cap member 52 is arranged on the vehicle outer side of the rear side pad member 51 to overlap the rear side pad member 51 so as to close a portion of the rear side opening 11*b* in the door outer panel 11. The configurations of the rear side pad member 51 and the cap member 52 are not particularly limited, and various other conventionally known configurations may be applied.

Figure 3:
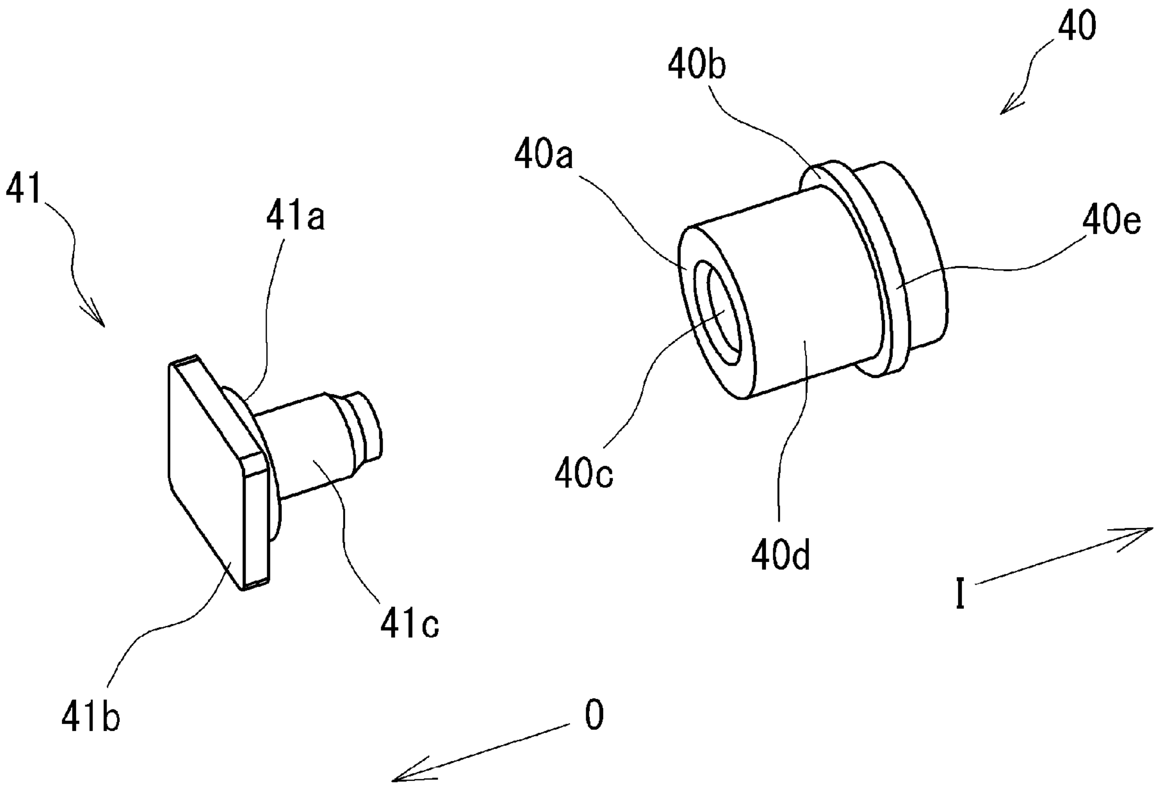
FIG. 3 is a perspective view illustrating a configuration example of a first fastening member and a second fastening member.

FIG. 3 is a perspective view illustrating a configuration example of the first fastening member 40 and the second fastening member 41 of the first embodiment. In the first embodiment, a TORX nut (female screw) ("TORX" is a registered trademark of Acument Intellectual Properties, LLC) is applied as the first fastening member 40, and a bolt (male screw) is applied as the second fastening member 41.

The TORX nut as the first fastening member 40 is formed of a metal material, has a cylindrical shape as a whole, and has a female screw portion 40*c*, a first panel engaging portion 40*a*, and a base frame engaging portion 40*b*. The female screw portion 40*c* is provided with a screw hole into which a male screw portion 41*c* of the second fastening member 41 is able to be fastened. The first panel engaging portion 40*a* is configured to be engaged (come into contact) with the surface on the vehicle inner side of the door outer panel 11. In the present embodiment, the end surface located on the vehicle outer side of the first fastening member 40 is the first panel engaging portion 40*a*. The base frame engaging portion 40*b* is configured to be engaged (come into contact) with the engaging rib 20*d* (see FIG. 5) provided on the first fastening member accommodating portion 20*c* of the base frame 20, and is provided at a position spaced apart from the first panel engaging portion 40*a* to the vehicle inner side.

For example, the first fastening member 40 has a portion 40*d* which is provided near the end thereof on the vehicle outer side and has a first outer diameter and a portion 40*e* which is located on the vehicle inner side of the portion 40*d* having the first outer diameter and has a second outer diameter larger than the first outer diameter of the portion 40*d*. Then, the stepped surface between the portion 40*d* having the first outer diameter and the portion 40*e* having the second outer diameter is the base frame engaging portion 40*b*. FIG. 3 illustrates, as the portion 40*e* having the second outer diameter, a rib provided on the outer peripheral surface of the first fastening member 40 so as to extend in the circumferential direction. However, the portion 40*e* having the second outer diameter is not limited to the rib. In short, the base frame engaging portion 40*b* may have any other configuration as long as it is located on the vehicle inner side of the first panel engaging portion 40*a* and has a larger outer diameter than the first panel engaging portion 40*a*.

The bolt as the second fastening member 41 is formed of a metal material, and has the male screw portion 41*c*, a held portion 41*b*, and a second panel engaging portion 41*a*. Then, as illustrated in FIG. 3, the held portion 41*b* is located on the end on the vehicle outer side, the second panel engaging portion 41*a* is located on the vehicle inner side of the held portion 41*b*, and the male screw portion 41*c* is located on the vehicle inner side of the second panel engaging portion 41*a*.

The held portion 41*b* is held by the second fastening member holding portion 30*e* of the front side pad member 30. In the configuration in which the second fastening member 41 is insert-molded on the front side pad member 30, the held portion 41*b* is embedded in the second fastening member holding portion 30*e*. Further, the held portion 41*b* is configured to prevent the second fastening member 41 from rotating relative to the front side pad member 30 when held by the second fastening member holding portion 30*e* of the front side pad member 30. For example, the held portion 41*b* may have a substantially quadrangular flat plate shape as illustrated in FIG. 3.

The male screw portion 41*c* is provided with a male screw that is able to be fastened into the female screw portion 40*c* of the first fastening member 40. The second panel engaging portion 41*a* is a surface that is engaged (comes into contact) with the surface on the vehicle outer surface of the door outer panel 11, and is configured to face the first panel engaging portion 40*a* of the first fastening member 40 in a state where the female screw portion 40*c* of the first fastening member 40 and the male screw portion 41*c* of the second fastening member 41 are fastened to each other. For example, the second fastening member 41 is provided with a stepped portion that protrudes from the held portion 41*b* to the vehicle inner side, and the end surface on the vehicle inner side of the stepped portion is the second panel engaging portion 41*a*.

The held portion 41*b* is not limited to the substantially quadrangular flat plate shape as illustrated in FIG. 3. The held portion 41*b* may have any other configuration as long as it is not separated from the front side pad member 30 and does not rotate relative to the front side pad member 30 in a state of being held by the second fastening member holding portion 30*e*. Further, the male screw portion 41*c* may have any other configuration as long as it is located on the vehicle inner side of the second panel engaging portion 41*a* rather than being located on the vehicle outer side thereof. Then, it is desirable that the distance from the second panel engaging portion 41*a* to the end surface on the vehicle outer side of the second fastening member 41 (in the example illustrated in FIG. 3, the total thickness of the held portion 41*b* and the stepped portion) be small.

As described above, both the first fastening member 40 and the second fastening member 41 are formed of a metal material, have the female screw portion 40*c* and the male screw portion 41*c* which may be fastened to each other, and have the first panel engaging portion 40*a* and the second panel engaging portion 41*a* which face each other in a state where the male screw portion 41*c* and the female screw portion 40*c* are fastened to each other.

Figure 4:
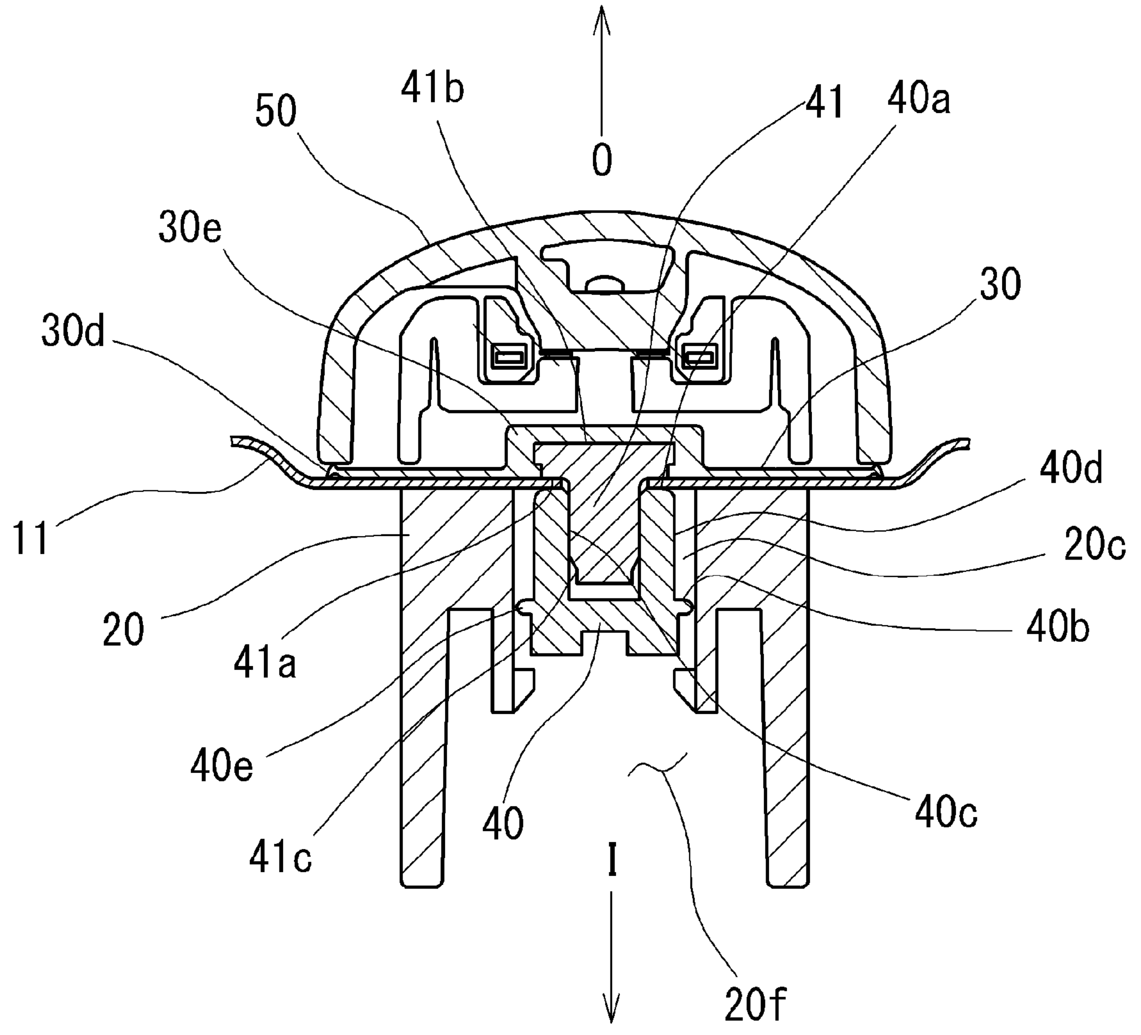
FIG. 4 is a cross-sectional view schematically illustrating the assembly structure of a base frame.
Figure 5:
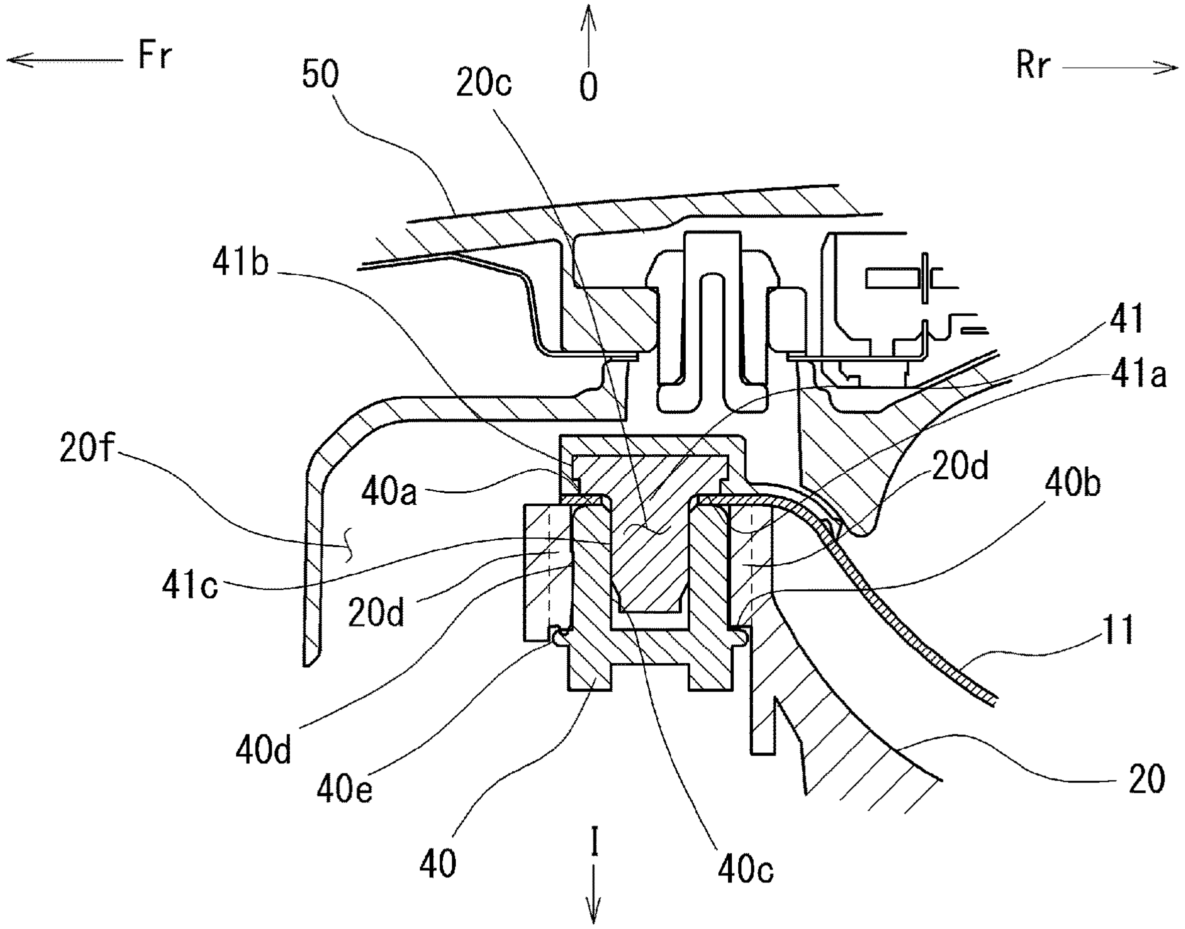
FIG. 5 is a cross-sectional view schematically illustrating the assembly structure of the base frame.

Next, the assembly structure of the handle device 100 will be described. FIGS. 4 and 5 are cross-sectional views schematically illustrating the assembly structure of the handle device 100. FIG. 4 illustrates a cross section taken along a vertical plane, and FIG. 5 illustrates a cross section taken along a horizontal plane.

As illustrated in FIGS. 4 and 5, the first fastening member 40 is accommodated in the first fastening member accommodating portion 20*c* of the base frame 20. The first fastening member accommodating portion 20*c* is a through-hole that communicates the vehicle inner side with the vehicle outer side, and is configured to be able to accommodate therein the first fastening member 40. The engaging rib 20*d* is provided on the inner peripheral surface of the first fastening member accommodating portion 20*c*. The engaging rib 20*d* has, for example, a convex structure to extend in the axial direction of the first fastening member accommodating portion 20*c*. When the first fastening member 40 is accommodated in the first fastening member accommodating portion 20*c*, the first panel engaging portion 40*a* which is the end surface on the vehicle outer side of the first fastening member is not engaged with the engaging rib 20*d* but is exposed to an opening on the vehicle outer side of the first fastening member accommodating portion 20*c*. Further, the base frame engaging portion 40*b* of the first fastening member 40 is engaged (comes into contact) with the end on the vehicle outer side of the engaging rib 20*d*. The first fastening member accommodating portion 20*c* and the engaging rib 20*d* are configured such that the first panel engaging portion 40*a* of the first fastening member 40 and the surface on the vehicle outer side of the base frame 20 are flush with each other in a state where the base frame engaging portion 40*b* of the first fastening member 40 is engaged with the engaging rib 20*d*.

The number or the configuration of engaging ribs 20*d* is not particularly limited. The engaging rib 20 may have any other configuration as long as it is engaged with the base frame engaging portion 40*b* without hindering the insertion of the portion 40*d* having the first outer diameter of the first fastening member 40 and as long as the first panel engaging portion 40*a* of the first fastening member 40 and the surface on the vehicle outer side of the base frame 20 (the surface that is engaged with the door outer panel 11) are flush with each other in a state where the engaging rib 20*d* is engaged with the base frame engaging portion 40*b*.

Further, the held portion 41*b* of the second fastening member 41 is held by the second fastening member holding portion 30*e* of the front side pad member 30. The front side pad member 30 is arranged on the vehicle outer side of the door outer panel 11, and the outside handle 50 is arranged on the vehicle outer side of the front side pad member 30. Meanwhile, the base frame 20 is arranged on the vehicle inner side of the door outer panel 11. Then, by rotating the first fastening member 40 from the vehicle inner side of the door outer panel 11, the female screw portion 40*c* of the first fastening member 40 and the male screw portion 41*c* of the second fastening member 41 are fastened to each other.

When the first fastening member 40 and the second fastening member 41 are fastened to each other, the first panel engaging portion 40*a* of the first fastening member 40 is engaged with the surface on the vehicle inner side of the door outer panel 11, and the second panel engaging portion 41*a* of the second fastening member 41 is engaged with the surface on the vehicle outer side of the door outer panel 11. Then, the door outer panel 11 is sandwiched between the first panel engaging portion 40*a* of the first fastening member 40 and the second panel engaging portion 41*a* of the second fastening member 41. Further, the base frame engaging portion 40*b* of the first fastening member 40 is engaged with the end on the vehicle inner side of the engaging rib 20*d* provided on the inner peripheral surface of the first fastening member accommodating portion 20*c* of the base frame 20. Thus, the base frame 20 is restricted from moving to the vehicle inner side relative to the door outer panel 11. Therefore, the base frame 20 is held in a state of being assembled to the door outer panel 11.

The base frame engaging portion 40*b* of the first fastening member 40 may have any other configuration as long as it is engaged (comes into contact) with the end surface of the engaging rib 20*d* provided on the inner peripheral surface of the first fastening member accommodating portion 20*c* of the base frame 20. The base frame engaging portion 40*b* of the first fastening member 40 may not apply a force in the axial direction to the engaging rib 20*d* (may not press the base frame 20 against the surface on the vehicle inner side of the door outer panel 11).

As described above, in the first embodiment, the door outer panel 11 formed of a metal material is directly sandwiched between the first fastening member 40 and the second fastening member 41 which are formed of a metal material. With this configuration, even if the base frame 20 formed of a resin material is softened due to a temperature rise or is deformed over time, the force with which the door outer panel 11 is sandwiched between the first fastening member 40 and the second fastening member 41 does not change. That is, the force with which the door outer panel 11 is sandwiched between the first fastening member 40 and the second fastening member 41 is not influenced by the softening or deformation of the base frame 20. Accordingly, the occurrence of rattling of the base frame 20 against the door outer panel 11 may be prevented.

Further, in the first embodiment, the door outer panel 11 is directly sandwiched between the first fastening member 40 and the second fastening member 41 which are formed of a metal material. In the conventional configuration, the metallic spacer is used since the door outer panel 11 is sandwiched between members formed of a metal material, but, in the present embodiment, the door outer panel 11 may be sandwiched between the first fastening member 40 and the second fastening member 41 which are formed of a metal material even if no metallic spacer is used. Therefore, no metallic spacer is required, which may contribute to a reduction in the number of parts and thus, a reduction in the cost of parts.

Further, according to the first embodiment, since the male screw portion 41*c* of the second fastening member 41 does not protrude to the vehicle outer side of the door outer panel 11, the dimension by which the second fastening member 41 protrudes to the vehicle outer side of the door outer panel 11 may be reduced. Therefore, the appearance of the design of the outside handle 50 may be improved. That is, the design of the outside handle 50 is influenced by the dimension of the second fastening member 41 existing inside the outside handle 50. Then, when the dimension by which the second fastening member 41 protrudes from the door outer panel 11 to the vehicle outer side is increased, it is necessary to increase the height of the outside handle 50 protruding to the vehicle outer side in order to avoid interference between the outside handle 50 and the second fastening member 41. Therefore, the appearance of the design of the outside handle 50 deteriorates. Meanwhile, in the present embodiment, since the dimension by which the second fastening member 41 protrudes from the door outer panel 11 to the vehicle outer side may be reduced, the dimension by which the outside handle 50 protrudes to the vehicle outer side may be reduced. Accordingly, the degree of freedom in the design of the outside handle 50 may be improved, which may contribute to the improved appearance.

In particular, in order to secure the coupling strength between the first fastening member 40 and the second fastening member 41, the female screw portion 40*c* of the first fastening member 40 and the male screw portion 41*c* of the second fastening member 41 need to secure the dimension in the axial direction thereof to some extent. Therefore, in a configuration in which the male screw portion 41*c* of the second fastening member 41 is located on the vehicle outer side of the door outer panel 11, the dimension by which the second fastening member 41 protrudes from the door outer panel 11 to the vehicle outer side is increased. Meanwhile, in the present embodiment, since the male screw portion 41*c* is configured to be arranged on the vehicle inner side of the door outer panel 11 (not arranged on the vehicle outer side of the door outer panel 11), it is possible to reduce the dimension by which the second fastening member 41 protrudes from the door outer panel 11 while securing the fastening strength of the first fastening member 40 and the second fastening member 41. Furthermore, by forming the held portion 41*b* and the stepped portion into a flat plate shape, it is possible to suppress the dimension by which the second fastening member 41 protrudes to the vehicle outer side of the door outer panel 11.

Second Embodiment

Figure 6:
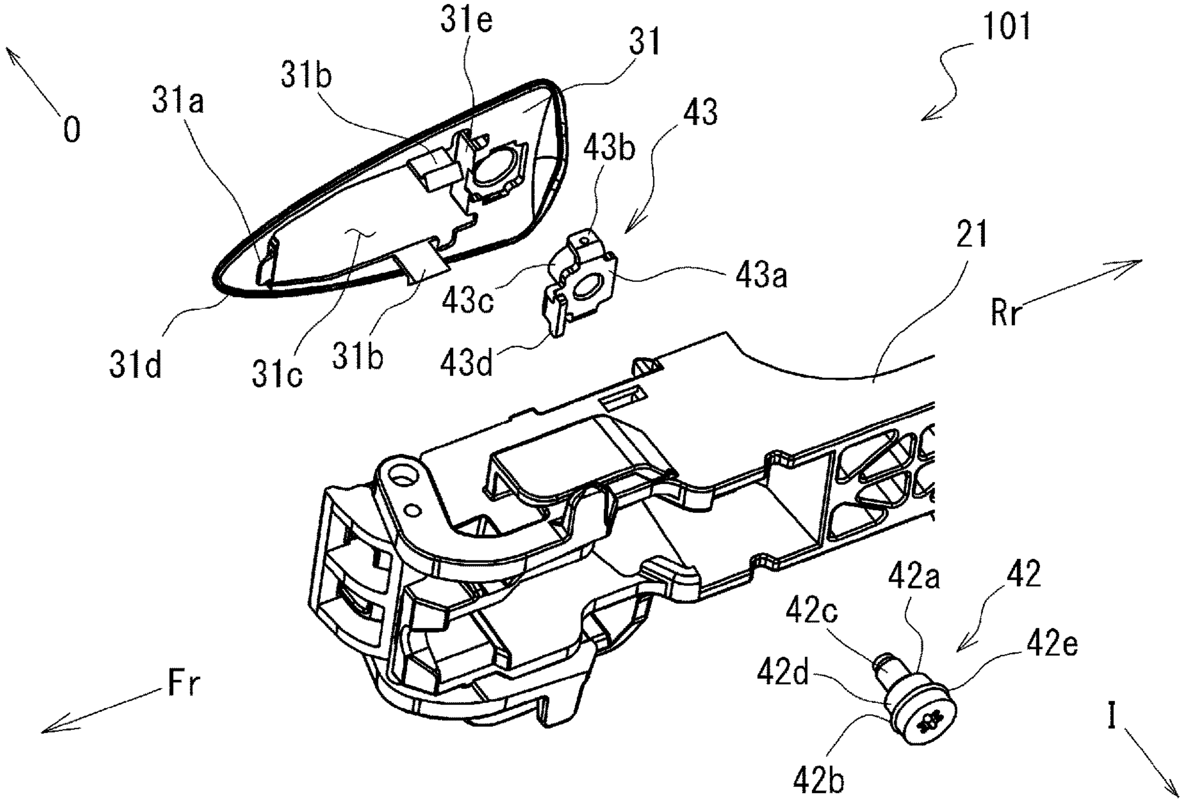
FIG. 6 is an exploded perspective view schematically illustrating a configuration example of a vehicle door handle device according to a second embodiment.
Figure 7:
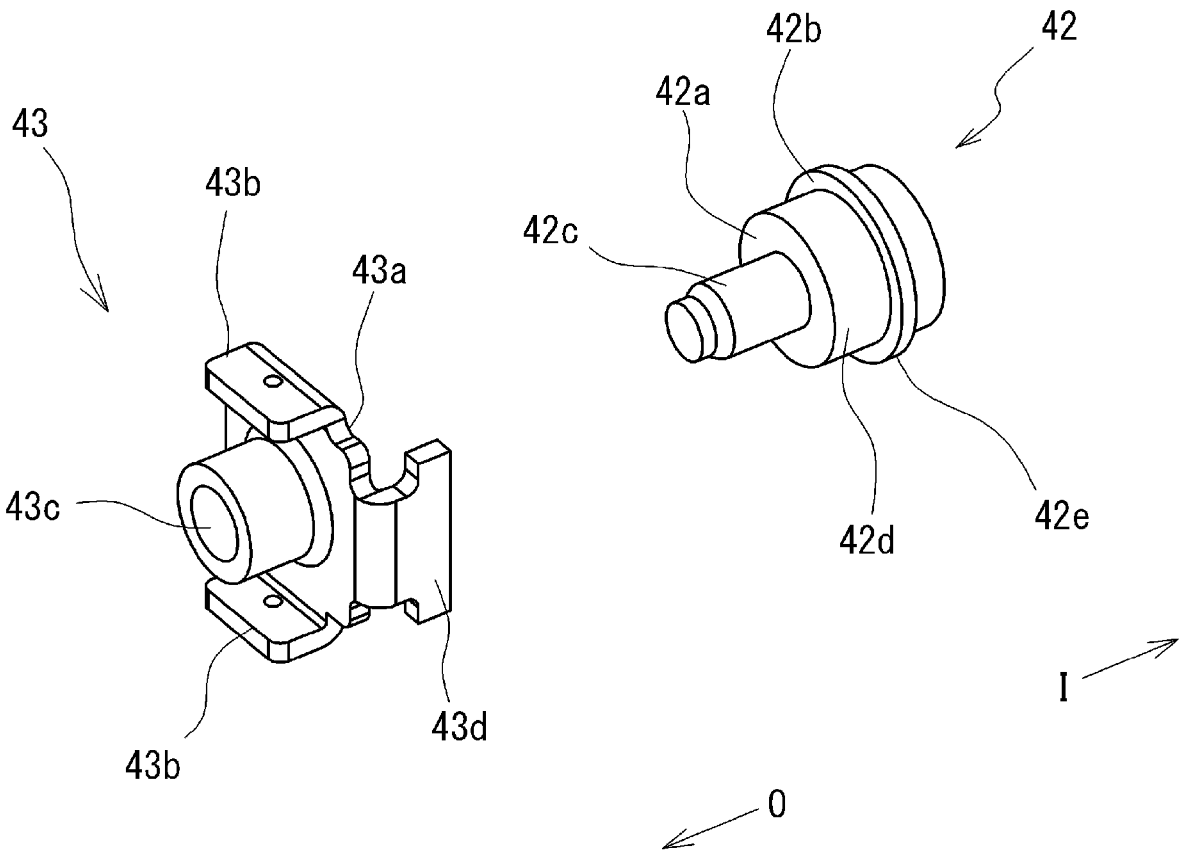
FIG. 7 is a perspective view illustrating a configuration example of a first fastening member and a second fastening member.
Figure 8:
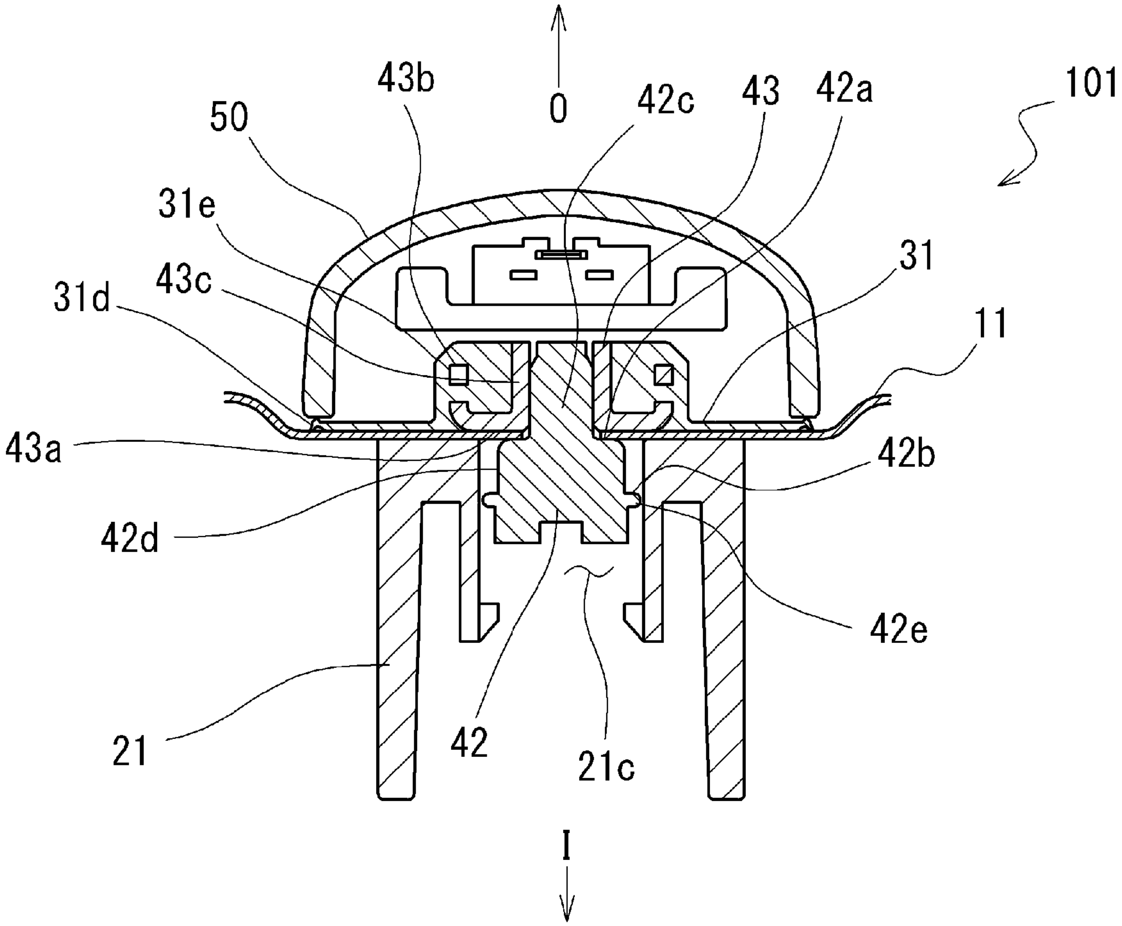
FIG. 8 is a cross-sectional view schematically illustrating the assembly structure of a base frame.
Figure 9:
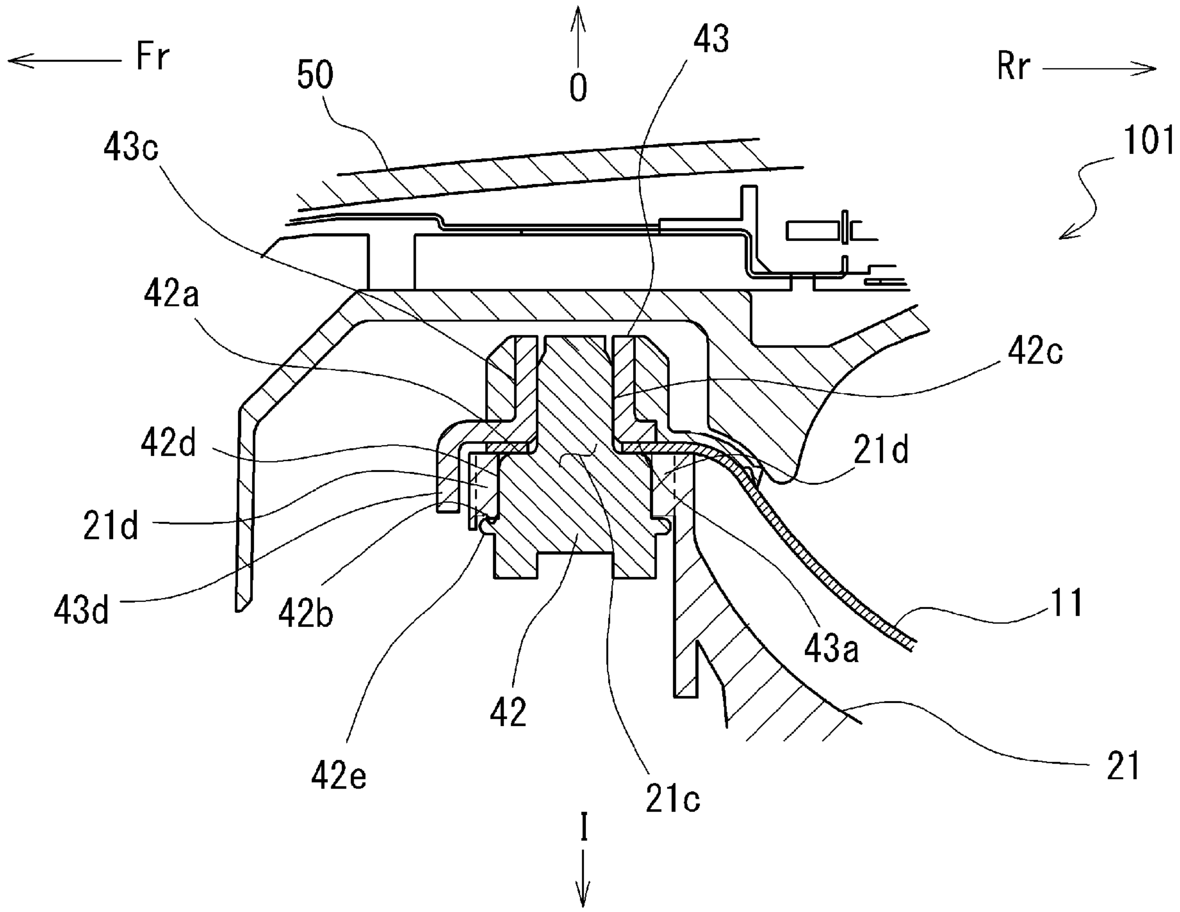
FIG. 9 is a cross-sectional view schematically illustrating the assembly structure of the base frame.

Next, a second embodiment will be described. A description of the configuration common to the first embodiment may be omitted. FIG. 6 is an exploded perspective view schematically illustrating a configuration example of major parts of a handle device 101 according to a second embodiment. FIG. 7 is a perspective view illustrating a configuration example of a first fastening member 42 and a second fastening member 43. FIGS. 8 and 9 are cross-sectional views illustrating the assembly structure of the handle device 101. FIG. 8 is a cross-sectional view taken along a vertical plane, and FIG. 9 is a cross-sectional view taken along a horizontal plane. In the second embodiment, a bolt (male screw) is applied as the first fastening member 42, and a nut (female screw) is applied as the second fastening member 43.

The bolt as the first fastening member 42 is formed of a metal material, and has a male screw portion 42*c*, a first panel engaging portion 42*a*, and a base frame engaging portion 42*b*. The male screw portion 42*c* is able to be fastened to a female screw portion 43*c* of the second fastening member 43. The first panel engaging portion 42*a* is engaged (comes into contact) with the surface on the vehicle inner side of the door outer panel 11. The first fastening member 42 has a portion 42*d* having a third outer diameter larger than that of the male screw portion 42*c*. The portion 42*d* having the third outer diameter is provided at a position on the vehicle inner side of the male screw portion 42*c*. The stepped surface between the male screw portion 42*c* and the portion 42*d* having the third outer diameter is the first panel engaging portion 40*a*. The base frame engaging portion 42*b* is engaged (comes into contact) with an engaging rib 21*d* provided on the inner peripheral surface of a first engaging member accommodating portion 21*c* of a base frame 21. Therefore, the outer diameter of the base frame engaging portion 42*b* is larger than the outer diameter of the first panel engaging portion 42*a*. In this way, the first fastening member 42 has a portion 42*e* that is located on the vehicle inner side of the portion 42*d* having the third outer diameter and that has a fourth outer diameter larger than the third outer diameter. Then, the stepped surface between the portion 42*d* having the third outer diameter and the portion 42*e* having the fourth outer diameter is the first panel engaging portion 42*a*.

FIGS. 6 to 9 illustrate a configuration in which a rib extending in the circumferential direction is applied as the portion 42*e* having the fourth outer diameter, but the disclosure is not limited to this configuration. The first fastening member 42 may have any other configuration as long as it has the male screw portion 42*c*, the first panel engaging portion 42*a* located on the vehicle inner side of the male screw portion 42*c*, and the base frame engaging portion 42*b* located on the vehicle inner side of the first panel engaging portion 42*a*. Then, the first fastening member 42 may have any other configuration as long as the outer diameter of the base frame engaging portion 42*b* is larger than the outer diameter of the first panel engaging portion 42*a*.

The nut as the second fastening member 43 is formed of a metal material, and has the female screw portion 43*c*, a second panel engaging portion 43*a*, and a held portion 43*b*. The female screw portion 43*c* is provided with a screw hole into which the male screw portion 42*c* of the first fastening member 42 is able to be fastened. The second panel engaging portion 43*a* is a surface that is engaged (comes into contact) with the surface on the vehicle outer side of the door outer panel 11, and is configured to face the first panel engaging portion 42*a* of the first fastening member 42 in a state where the female screw portion 43*c* is fastened with the male screw portion 42*c* of the first fastening member 42. Further, the second panel engaging portion 43*a* is located on the vehicle inner side of the female screw portion 43*c*. For example, as illustrated in FIGS. 6 and 7, a portion having a substantially quadrilateral flat plate shape is provided on the end on the vehicle inner side of the female screw portion 43*c*, and the end surface on the vehicle inner side of the portion having a flat plate shape is the second panel engaging portion 43*a*. The held portion 43*b* is held by a second fastening member holding portion 31*e* of a front side pad member 31. In a configuration in which the second fastening member 43 is insert-molded on the second fastening member holding portion 31*e*, the held portion 43*b* is embedded in the second fastening member holding portion 31*e*. The held portion 43*b* is located on the vehicle outer side of the second panel engaging portion 43*a*. For example, as illustrated in FIGS. 6 and 7, the held portion 43*b* may have a flat plate shape to extend from the outer edge of the portion having a flat plate shape to the vehicle outer side.

Moreover, the second fastening member 43 may have a rotation stopping portion 43*d*. The rotation stopping portion

43*d* has a function of preventing the second fastening member 43 from rotating together with the front side pad member 31 relative to the door outer panel 11 when the first fastening member 42 and the second fastening member 43 are fastened to each other. For example, the rotation stopping portion 43*d* has a flat plate shape to extend from the outer edge of the portion having a flat plate shape to the vehicle inner side, and is configured to be engaged with the base frame 21 so as to be able to prevent from the second fastening member 43 from rotating relative to the door outer panel 11.

The second fastening member 43 of the second embodiment may be formed by pressing a metal plate material such that the female screw portion 43*c*, the portion having a flat plate shape, the held portion 43*b*, and the rotation stopping portion 43*d* are integrally formed with one another. For example, the female screw portion 43*c* may be formed by burring the metal plate material, and the held portion 43*b* and the rotation stopping portion 43*d* may be formed by bending the metal plate material.

As described above, both the first fastening member 42 and the second fastening member 43 are formed of a metal material and have the male screw portion 42*c* and the female screw portion 43*c* which may be fastened to each other. Then, the first fastening member 42 and the second fastening member 43 respectively have the first panel engaging portion 42*a* and the second panel engaging portion 43*a* which face each other in a state where the male screw portion 42*c* and the female screw portion 43*c* are fastened to each other.

The front side pad member 31 has a panel engaging portion 31*a*, a base frame engaging portion 31*b*, an opening 31*c*, a seal 31*d*, and the second fastening member holding portion 31*e*, similarly to the first embodiment. The second fastening member holding portion 31*e* is configured to hold the held portion 43*b* of the second fastening member 43. A concrete configuration of the second fastening member holding portion 31*e* is not limited. The second fastening member holding portion 31*e* may have any other configuration as long as it may hold the held portion 43*b* of the second fastening member 43 so as to prevent separation and relative rotation of the held portion 43*b* (to prevent the held portion 43*b* from moving to the vehicle inner side relative to the front side pad member 31).

Next, the assembly structure of the handle device 101 of the second embodiment will be described. As illustrated in FIGS. 8 and 9, the first fastening member 42 is accommodated in the first fastening member accommodating portion 21*c* of the base frame 21. Further, the held portion 43*b* of the second fastening member 43 is held by the second fastening member holding portion 31*e* of the front side pad member 31. Then, the front side pad member 31 is arranged on the vehicle outer side of the door outer panel 11, and the outside handle 50 is arranged on the vehicle outer side of the front side pad member 31. Meanwhile, the base frame 21 is arranged on the vehicle inner side of the door outer panel 11. Then, by fastening the male screw portion 42*c* of the first fastening member 42 and the female screw portion 43*c* of the second fastening member 43 to each other, the base frame 21 and the front side pad member 31 are fixed to the door outer panel 11.

In a state where the base frame 21 and the front side pad member 31 are fixed to the door outer panel 11, the first panel engaging portion 42*a* of the first fastening member 42 is engaged with the surface on the vehicle inner side of the door outer panel 11, and the second panel engaging portion 43*a* of the second fastening member 43 is engaged with the surface on the vehicle outer side of the door outer panel 11. Then, the door outer panel 11 is sandwiched between the first panel engaging portion 42*a* of the first fastening member 42 and the second panel engaging portion 43*a* of the second fastening member 43. Further, the base frame engaging portion 42*b* of the first fastening member 42 is engaged with the end on the vehicle inner side of the engaging rib 21*d* provided on the inner peripheral surface of the first fastening member accommodating portion 21*c* of the base frame 21. Thus, the base frame 21 is held in a state of being assembled to the door outer panel 11 and is restricted from moving from the door outer panel 11 to the vehicle inner side.

The base frame engaging portion 42*b* of the first fastening member 42 may have any other configuration as long as it is engaged (comes into contact) with the end surface of the engaging rib 21*d* provided on the inner peripheral surface of the first fastening member accommodating portion 21*c* of the base frame 21. The base frame engaging portion 42*b* of the first fastening member 42 may not apply a force in the axial direction to the engaging rib 21*d*.

As described above, in the second embodiment, the door outer panel 11 formed of a metal material is directly sandwiched between the first fastening member 42 and the second fastening member 43 which are formed of a metal material. Accordingly, similarly to the first embodiment, the occurrence of rattling of the base frame 21 against the door outer panel 11 may be prevented. Further, for example, a metallic spacer is not required to realize a configuration in which the door outer panel 11 is sandwiched between members formed of a metal material. Accordingly, the number of parts may be reduced and thus, the cost of parts may be reduced.

A vehicle door handle device 100, 101 according to an aspect of this disclosure includes a base frame 20, 21 formed of a resin material and arranged on a vehicle inner side of a door outer panel 11 that constitutes a surface on a vehicle outer side of a vehicle door 10, a pad member 30, 31 arranged on a vehicle outer side of the door outer panel 11, a first fastening member 40, 42 formed of a metal material and having a base frame engaging portion 40*b*, 42*b* that is engageable with the base frame 20, 21 and a first panel engaging portion 40*a*, 42*a* that is engageable with a surface on the vehicle inner side of the door outer panel 11, and a second fastening member 41, 43 formed of a metal material and having a held portion 41*b*, 43*b* held by the pad member 30 and a second panel engaging portion 41*a*, 43*a* that is engageable with a surface on the vehicle outer side of the door outer panel 11, in which the first fastening member 40, 42 and the second fastening member 41, 43 are fastened to each other, the door outer panel 11 is sandwiched between the first panel engaging portion 40*a*, 42*a* and the second panel engaging portion 41*a*, 43*a*, and the base frame engaging portion 40*b*, 42*b* is engaged with the base frame 20, 21 so as to restrict movement of the base frame 20, 21 in a direction away from the door outer panel 11.

According to this disclosure, the door outer panel 11 formed of a metal material is directly sandwiched between the first fastening member 40, 42 and the second fastening member 41, 43 which are formed of a metal material. Therefore, even if the base frame 20, 21 formed of a resin material is softened or deformed, there is no change in the force with which the door outer panel 11 is sandwiched between the first fastening member 40, 42 and the second fastening member 41, 43. That is, the force with which the door outer panel 11 is sandwiched between the first fastening member 40, 42 and the second fastening member 41, 43 is not influenced by the softening or deformation of the base frame 20, 21. Accordingly, the occurrence of rattling of the base frame 20, 21 against the door outer panel 11 may be prevented. Further, according to this disclosure, the door outer panel 11 may be sandwiched between the first fastening member 40, 42 and the second fastening member 41, 43 which are formed of a metal material without using a metallic spacer. Therefore, no metallic spacer is required, which may contribute to a reduction in the number of parts and thus, a reduction in the cost of parts. Accordingly, according to this disclosure, it is possible to prevent a reduction in the fastening force between the first fastening member 40, 42 and the second fastening member 41, 43 while suppressing an increase in the cost of parts.

Further, the second fastening member 41 may have a male screw portion 41*c* located on a vehicle inner side than the held portion 41*b* and the second panel engaging portion 41*a* and located on the vehicle inner side than the door outer panel 11, the first fastening member 40 may have a female screw portion 40*c* that is fastenable with the male screw portion 41*c* of the second fastening member 41, and the male screw portion 41*c* and the female screw portion 40*c* may be fastened to each other on the vehicle inner side than the door outer panel 11.

With this configuration, since the male screw portion 41*c* of the second fastening member 41 does not protrude to the vehicle outer side of the door outer panel 11, the dimension by which the second fastening member 41 protrudes to the vehicle outer side of the door outer panel 11 may be reduced. Therefore, the dimension by which an outside handle 50 protrudes to the vehicle outer side may be reduced, which may contribute to an improvement in the appearance of the design of the outside handle 50.

Furthermore, the first fastening member 40 may have a portion 40*d* having a first outer diameter and a portion 40*e* provided on a vehicle inner side than the portion 40*d* having the first outer diameter and having a second outer diameter larger than the first outer diameter, the first panel engaging portion 40*a* may be an end surface on a vehicle outer side of the first fastening member, and the base frame engaging portion 40*b* may be a stepped surface between the portion 40*d* having the first outer diameter and the portion 40*e* having the second outer diameter.

Further, the second fastening member 43 may have a female screw portion located on a vehicle outer side than the held portion 43*b* and the second panel engaging portion 43*a*, the first fastening member 42 may have a male screw portion 42*c* that is fastenable with the female screw portion 43*c* of the second fastening member 43, and the male screw portion 42*c* and the female screw portion 43*c* may be fastened to each other on a vehicle outer side than the surface on the vehicle outer side of the door outer panel 11.

Furthermore, the first fastening member 42 may have a portion 42*d* provided on a vehicle inner side of the male screw portion 42*c* and having a third outer diameter larger than that of the male screw portion 42*c* and a portion 42*e* provided on a vehicle inner side than the portion 42*d* having the third outer diameter and having a fourth outer diameter larger than the third outer diameter, the first panel engaging portion 42*a* may be a stepped surface between the male screw portion 42*c* and the portion 42*d* having the third outer diameter, and the base frame engaging portion 42*b* may be a stepped surface between the portion 42*d* having the third outer diameter and the portion 42*e* having the fourth outer diameter.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A door handle device for a vehicle door, the door handle device comprising:

a base frame formed of a resin material and arranged on a vehicle inner side of a door outer panel of the vehicle door;

a pad member arranged on a vehicle outer side of the door outer panel;

a first fastening member formed of a metal material and having 1) a base frame engaging portion that is directly engaged with the base frame and 2) a first panel engaging portion that is directly engaged with a surface of the door outer panel on the vehicle inner side of the door outer panel; and a second fastening member formed of a metal material and having 1) a held portion held by the pad member by contact of the pad member with a surface of the held portion facing away from the door outer panel and with a surface of the held portion facing toward the first fastening member when the first fastening member and the second fastening member are fastened to each other such that the held portion is sandwiched between the door outer panel and the pad member, and 2) a second panel engaging portion that is directly engaged with a surface of the door outer panel on the vehicle outer side of the door outer panel, wherein when the first fastening member and the second fastening member are fastened to each other, the first panel engaging portion is directly engaged with the surface of the door outer panel on the vehicle inner side of the door outer panel and the second panel engaging portion is directly engaged with the surface of the door outer panel on the vehicle outer side of the door outer panel such that the door outer panel is sandwiched between the first panel engaging portion and the second panel engaging portion, and the base frame engaging portion is directly engaged with the base frame so as to restrict movement of the base frame in a direction away from the door outer panel, the second fastening member has a male screw portion, the first fastening member has a female screw portion that is fastenable with the male screw portion of the second fastening member, and the male screw portion and the female screw portion are fastened to each other on the vehicle inner side of the door outer panel.

2. The door handle device according to claim 1, wherein the first fastening member has a portion having a first outer diameter, and a portion having a second outer diameter larger than the first outer diameter, the portion having the first outer diameter being disposed between the door outer panel and the portion having the second outer diameter, the first panel engaging portion is an end surface of the first fastening member, and the base frame engaging portion is a surface stepped between the portion having the first outer diameter and the portion having the second outer diameter.

* * * * *